(12) United States Patent
Sugiyama

(10) Patent No.: US 9,507,236 B2
(45) Date of Patent: Nov. 29, 2016

(54) OPTICAL MODULE AND TRANSMITTING APPARATUS

(71) Applicant: Fujitsu Optical Components Limited, Kawasaki-shi, Kanagawa (JP)

(72) Inventor: Masaki Sugiyama, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/710,072

(22) Filed: May 12, 2015

(65) Prior Publication Data

US 2016/0011487 A1    Jan. 14, 2016

(30) Foreign Application Priority Data

Jul. 11, 2014  (JP) .................................. 2014-143402

(51) Int. Cl.
*G02F 1/225*   (2006.01)
*G02F 1/01*    (2006.01)
*G02F 1/21*    (2006.01)

(52) U.S. Cl.
CPC ............ *G02F 1/225* (2013.01); *G02F 1/0121* (2013.01); *G02F 2001/212* (2013.01); *G02F 2201/18* (2013.01)

(58) Field of Classification Search
None
See application file for complete search history.

(56) References Cited

U.S. PATENT DOCUMENTS

| 2003/0031001 | A1* | 2/2003 | Chu ..................... G02F 1/13452 361/784 |
| 2004/0118603 | A1* | 6/2004 | Chambers ............. G01R 1/0735 174/261 |
| 2014/0119686 | A1* | 5/2014 | Sugiyama ............. G02F 1/2255 385/2 |
| 2015/0253593 | A1* | 9/2015 | Sugiyama ............. G02F 1/0121 385/40 |

FOREIGN PATENT DOCUMENTS

| JP | 2001-83908 A | * 3/2001 |
| JP | 2007-234500 | 9/2007 |
| JP | 2010-278132 | 12/2010 |
| JP | 201 1-1 3804 | * 7/2011 |

* cited by examiner

*Primary Examiner* — Mike Stahl
(74) *Attorney, Agent, or Firm* — Staas & Halsey LLP

(57) ABSTRACT

An optical module includes: an optical modulator that performs an optical modulation process by using electrical signals input from a plurality of terminals; and a flexible substrate that has flexibility and electrically connects the optical modulator and a predetermined connector to each other via a plurality of wiring patterns formed on first and second surfaces thereof. The flexible substrate includes: a first pad including a first conductor pattern connected, on the first surface, to a wiring pattern, a second conductor pattern formed on the second surface, and a through hole that connects the first conductor pattern and the second conductor pattern to each other; and a second pad including a third conductor pattern connected, on the second surface, to a wiring pattern, a fourth conductor pattern formed on the first surface, and a through hole that connects the third conductor pattern and the fourth conductor pattern to each other.

7 Claims, 11 Drawing Sheets

OPTICAL MODULE AND TRANSMITTING APPARATUS

CROSS-REFERENCE TO RELATED APPLICATION

This application is based upon and claims the benefit of priority of the prior Japanese Patent Application No. 2014-143402, filed on Jul. 11, 2014, the entire contents of which are incorporated herein by reference.

FIELD

The embodiments discussed herein are related to an optical module and a transmitting apparatus.

BACKGROUND

Conventionally, with optical modulators that modulate light generated by a light source, a Mach-Zehnder interferometer may be used. In recent years, because optical modulation methods are diversified, each optical modulator is often provided with two or more Mach-Zehnder interferometers. In those situations, by integrating the two or more Mach-Zehnder interferometers on one chip, it is possible to keep the size of the optical modulator small.

An optical modulator provided with one or more Mach-Zehnder interferometers includes a signal electrode and a ground electrode provided along parallel optical waveguides. More specifically, an optical modulator may be provided with one or more Radio Frequency (RF) electrodes for high frequency signals used for multiplexing data onto light and one or more Direct Current (DC) electrodes for direct-current signals used for controlling the phase of the light and monitoring temperatures. These electrodes are each connected to a lead pin, so that electrical signals are input thereto from the lead pins. When an optical modulator is provided with two or more Mach-Zehnder interferometers, a larger number of electrodes are used, which also increases the number of lead pins being used.

The lead pins of an optical modulator may be connected to other component parts (e.g., a Large Scale Integration (LSI) circuit), by using a Flexible Printed Circuits (FPC) unit that has flexibility. In other words, for example, the lead pins of the optical modulator may be soldered onto one end of the FPC unit, while the other end of the FPC unit is inserted into a connector connected to the LSI circuit or the like. In that situation, the one end of the FPC unit onto which the lead pins are soldered has conductor pattern lands formed thereon in correspondence with the lead pins. In contrast, the other end of the FPC unit inserted into the connector has conductor pads formed thereon in correspondence with the lead pins, so that the pads are in contact with terminals provided inside the connector. Further, mutually-corresponding lands and pads are connected to one another by wiring patterns formed on the FPC unit.

Patent Document 1: Japanese Laid-open Patent Publication No. 2007-234500
Patent Document 2: Japanese Laid-open Patent Publication No. 2010-278132

Incidentally, as for positional arrangements, the terminals provided inside the connector and the lead pins of the optical modulator are not necessarily always arranged in a mutually-corresponding order. Consequently, on the FPC unit, the sets of lands and pads to be connected together are not arranged in the order of connection. Thus, the wiring patterns used for connecting the lands and the pads to one another may intersect one another. In that situation, because it is difficult to cause the wiring patterns to intersect one another on a single surface of the FPC unit, one of two intersecting wiring patterns may be formed on the front surface of the FPC unit, while the other of the two wiring patterns may be formed on the rear surface of the FPC unit. With this arrangement, it is possible to arrange the mutually-corresponding lands and pads to be connected to one another on the FPC unit. As a result, it is possible to connect the mutually-corresponding sets together that are made up of the terminals provided inside the connector and the lead pins of the optical modulator.

However, because all the terminals provided inside the connector are arranged on a single plane, in order to bring the pads formed on the FPC unit into contact with the terminals provided inside the connector, all the pads need to be formed on a single surface of the FPC unit. In other words, for example, when the front surface of the FPC unit is brought into contact with the terminals provided inside the connector, the pads that are connected to the wiring patterns formed on the rear surface of the FPC unit also need to be provided on the front surface of the FPC unit. For this reason, as for the wiring patterns formed on the rear surface of the FPC unit, for example, pads may be provided in such a manner that conductor patterns formed on the two surfaces of the FPC unit are connected to each other via a through hole. In contrast, as for the wiring patterns formed on the front surface of the FPC unit, for example, it is possible to use the conductor patterns themselves formed on the front surface of the FPC unit as pads, without any extra arrangement.

However, if the structures of the pads vary depending on whether the corresponding wiring pattern is formed on the front surface or the rear surface of the FPC unit, the thickness of the FPC unit varies among different parts corresponding to the different pads. Thus, a problem arises where the electrical conduction between the FPC unit and the connector becomes unstable. In other words, in the example described above, the pads for the wiring patterns formed on the rear surface of the FPC unit are provided in such a manner that the conductor patterns are formed on the two surfaces of the FPC unit and that these conductor patterns are connected to each other via the through hole. For this reason, those pads are thicker than the pads for the wiring patterns formed on the front surface of the FPC unit. Thus, there is a possibility that a contact failure may occur between the pads for the wiring patterns formed on the front surface of the FPC unit and the terminals provided inside the connector. As a result, the electrical conduction between the FPC unit and the connector becomes unstable.

SUMMARY

According to an aspect of an embodiment, an optical module includes: an optical modulator that performs an optical modulation process by using electrical signals input thereto from a plurality of terminals; and a flexible substrate that has flexibility and that electrically connects the optical modulator and a predetermined connector to each other via a plurality of wiring patterns formed on first and second surfaces thereof. The flexible substrate includes: a plurality of joining units each of which is joined to a different one of a plurality of terminals of the optical modulator; a first pad that is connectable to the connector and includes a first conductor pattern being connected, on the first surface, to a wiring pattern extending from a first joining unit among the plurality of joining units, a second conductor pattern being formed on the second surface in a position corresponding to a position of the first conductor pattern, and a through hole that connects the first conductor pattern and the second conductor pattern to each other; and a second pad that is connectable to the connector and includes a third conductor pattern being connected, on the second surface, to a wiring pattern extending from a second joining unit among the plurality of joining units, a fourth conductor pattern being formed on the first surface in a position corresponding to a position of the third conductor pattern, and a through hole that connects the third conductor pattern and the fourth conductor pattern to each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present disclosure is not limited to the exemplary embodiments.

[a] First Embodiment

Figure 1:
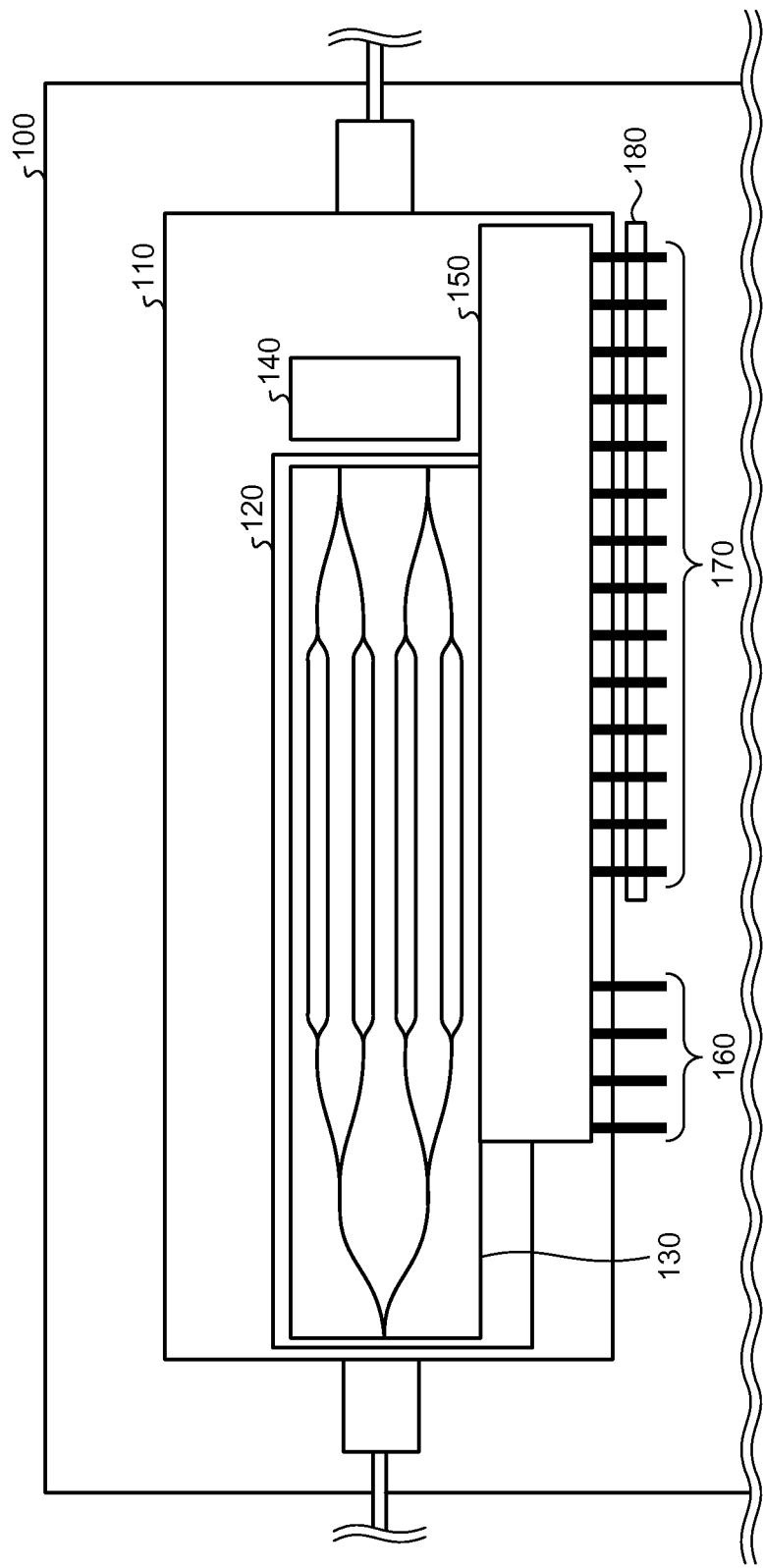
FIG. 1 is a schematic plan view of an optical module according to a first embodiment.

FIG. 1 is a schematic plan view of an optical module according to a first embodiment. The optical module illustrated in FIG. 1 includes a printed circuits board 100, an optical modulator 110, Radio Frequency (RF) pins 160, Direct Current (DC) pins 170, and a Flexible Printed Circuits (FPC) unit 180.

The printed circuits board 100 is configured with, for example, a glass epoxy substrate and has various types of component parts that structure the optical module mounted thereon. Although not illustrated in FIG. 1, on the printed circuits board 100, for example, a driver that generates RF signals having a high frequency and a Large Scale Integration (LSI) circuit that outputs a Direct Current (DC) signal are mounted. Further, electrodes are printed on at least one surface of the printed circuits board 100, so that the LSI circuit and a connector, for example, are electrically connected to each other by the electrodes.

The optical modulator 110 modulates light generated by a light source and outputs an optical signal. In that situation, the optical modulator 110 performs the optical modulation process on the basis of the RF signals that are input thereto from the RF pins 160. Further, the optical modulator 110 exercises phase control on the optical signal on the basis of the DC signals that are input thereto from the DC pins 170. More specifically, the optical modulator 110 includes a carrier 120, a modulator chip 130, a polarization beam combiner (PBC) 140, and a relay substrate 150.

The carrier 120 is a platform-like member on which the modulator chip 130 is placed. Provided beneath the carrier 120 is a temperature controlling device that employs a Peltier device, for example, so that the temperature of the modulator chip 130 is maintained to be constant by the temperature controlling device. In this situation, the temperature controlling device exercises the temperature control on the basis of the DC signals that are input thereto from the DC pins 170.

The modulator chip 130 includes optical waveguides parallel to each other, signal electrodes, and ground electrodes and is configured to generate the optical signal by performing the optical modulation process, while transferring the light from the light source through the optical waveguides. The modulator chip 130 includes, as the signal electrodes, signal electrodes for the RF signals and signal electrodes for the DC signals. Further, the modulator chip 130 performs the optical modulation process on the basis of the RF signals supplied to the signal electrodes from the RF pins 160. Further, the modulator chip 130 exercises the phase control or the like on the optical signal, on the basis of the DC signals supplied to the signal electrodes from the DC pins 170.

The optical waveguides are structured by, for example, forming a metal film of titanium (Ti) or the like on a part of a crystal substrate configured with electro-optic crystals of lithium niobate ($LiNbO_3$(LN)) or lithium tantalite ($LiTaO_2$) and applying thermal diffusion thereto. Alternatively, the optical waveguides may be structured by performing a proton exchange process in benzoic acid after a patterning process. Further, the signal electrodes and the ground electrodes are coplanar electrodes that are formed along the parallel optical waveguides. In FIG. 1, because four sets of parallel optical waveguides are formed on the modulator chip 130, a signal electrode and a ground electrode are formed in correspondence with each of the sets of optical waveguides. The signal electrodes and the ground electrodes are, for example, formed on each of the optical waveguides through a patterning process. Further, to prevent the light transferred through the optical waveguides from being absorbed by the signal electrodes and the ground electrodes, a buffer layer is provided between the crystal substrate and the signal and ground electrodes. As for the buffer layer, for example, silicon dioxide ($SiO_2$) or the like formed with a thickness of approximately 0.2 to 2 μm may be used.

The PBC 140 combines together two optical signals output from the modulator chip 130 and outputs an optical signal containing two polarized waves of which the polarization directions are orthogonal to each other. In other words, the PBC 140 rotates the polarization direction of one of the two optical signals output from the modulator chip 130 and subsequently combines the one optical signal with the other optical signal.

The relay substrate 150 relays the RF signals that are input thereto from the RF pins 160 to the modulator chip 130, so as to input the RF signals to the signal electrodes of the modulator chip 130. Further, the relay substrate 150 relays the DC signals that are input thereto from the DC pins 170 to the modulator chip 130, so as to input the DC signals to the signal electrodes of the modulator chip 130. To input a plurality of electrical signals to the modulator chip 130, when all the electrical signal input sections are arranged in a row on one side of the optical modulator 110, it is possible to facilitate the mounting process and to keep the mounting area small. For this reason, in the first embodiment, the optical modulator 110 is provided with the relay substrate 150, so that the electrical signals that are input from the one side of the optical modulator 110 are relayed to the modulator chip 130 by the relay substrate 150.

The RF pins 160 are the pins to which the RF signals that have a high frequency (e.g., 32 Gb/s) and are generated by a driver, for example, are input. The optical modulator 110 includes the plurality of RF pins 160 in accordance with the number of signal electrodes included in the modulator chip 130. By driving the modulator chip 130 on the basis of the RF signals input to the RF pins 160, it is possible to obtain the optical signal resulting from the optical modulation process performed on the light from the light source.

The DC pins 170 are the pins to which the Direct Current (DC) signals output from the LSI circuit, for example, are input. On a lateral face of the optical modulator 110, the plurality of DC pins 170 are provided while being arranged in a row, for example, in accordance with the number of signal electrodes included in the modulator chip 130. On the basis of the DC signals input to the DC pins 170, the phase control is exercised on the optical signals obtained by the modulator chip 130, and the temperature control is exercised by the temperature controlling device.

The FPC unit 180 is a flexible substrate having flexibility. One end of the FPC unit 180 is connected to the optical modulator 110, whereas the other end thereof is connected to the connector connected to, for example, the LSI circuit. More specifically, on the one end of the FPC unit 180, a plurality of lands onto which the respective DC pins 170 are soldered are formed. On the other end of the FPC unit 180, a plurality of pads to be in contact with the respective terminals provided inside the connector are formed. Further, on the front and the rear surfaces of the FPC unit 180, wiring patterns used for connecting each of the lands to a corresponding one of the pads are formed. The FPC unit 180 electrically connects the optical modulator 110 and the LSI circuit to each other, by connecting the DC pins 170 and the connector to each other. The structure of the FPC unit 180 will be explained in detail later.

Figure 2:
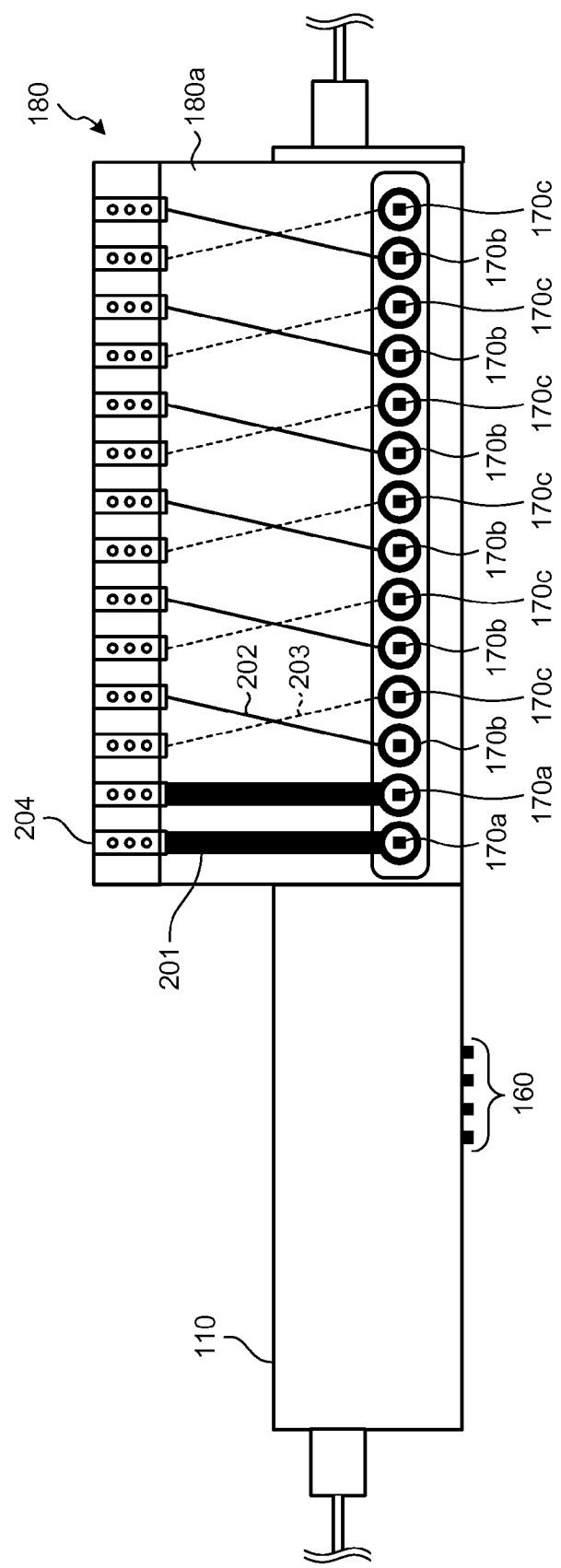
FIG. 2 is a schematic lateral view of the optical module according to the first embodiment.

FIG. 2 is a schematic lateral view of the optical module according to the first embodiment. FIG. 2 illustrates a situation where one end of the FPC unit 180 is connected to the optical modulator 110 by the DC pins 170, while the other end is not connected to anything.

As illustrated in FIG. 2, the FPC unit 180 has three types of wiring patterns formed thereon that are namely wiring patterns 201 used for exercising the temperature control, wiring patterns 202 formed on a first surface of the FPC unit 180, and wiring patterns 203 formed on a second surface of the FPC unit 180. In this situation, the first and the second surfaces of the FPC unit 180 correspond to, for example, the front surface and the rear surface of an FPC core structuring the FPC unit 180. In the following explanation, the surface that is positioned farther from the optical modulator 110 and closer to viewers of the drawing in FIG. 2 will be referred to as the first surface, whereas the surface that is positioned closer to the optical modulator 110 and farther from viewers of the drawing in FIG. 2 will be referred to as the second surface. Because the wiring patterns 202 formed on the first surface and the wiring patterns 203 formed on the second surface are formed on the mutually-different surfaces of the FPC unit 180, the wiring patterns may intersect one another.

One end of one of the wiring patterns 201 is connected to a land joined to a DC pin 170a. In other words, the DC pin 170a extending through a through hole formed in the FPC unit 180 is soldered onto the land formed in a surrounding area of the through hole, so that the one end of the wiring pattern 201 is connected to the land. Further, the other end of the wiring pattern 201 is connected to the pad 204.

One end of one of the wiring patterns 202 is connected to a land joined to a DC pin 170b. In other words, the DC pin 170b extending through a through hole formed in the FPC unit 180 is soldered onto the land formed in a surrounding area of the through hole, so that the one end of the wiring pattern 202 is connected to the land. Further, the other end of the wiring pattern 202 is connected to the pad 204.

One end of one of the wiring patterns 203 is connected to a land joined to a DC pin 170c. In other words, the DC pin 170c extending through a through hole formed in the FPC unit 180 is soldered onto the land formed in a surrounding area of the through hole, so that the one end of the wiring pattern 203 is connected to the land. Further, the other end of the wiring pattern 203 is connected to the pad 204.

Further, on the first surface of the FPC unit 180, the wiring patterns 201 and 202 are covered by a cover lay 180a. In contrast, surrounding areas of the lands joined to the DC pins 170a to 170c and surrounding areas of the pads 204 are not covered by the cover lay 180a. Consequently, the pads 204 are exposed to the surface and thus are able to be in contact with the terminals provided inside the connector.

In this situation, although the plurality of pads 204 are connected to the wiring patterns 201 to 203, which are of the mutually-different types, the pads 204 have mutually the same configuration. In other words, each of the pads 204 has such a structure that the conductor patterns formed on the first and the second surfaces of the FPC unit 180 are connected to each other by through holes. Because all of the plurality of pads 204 have mutually the same configuration in this manner, the thickness and the firmness are uniform among the pads 204 connected to the connector, and it is therefore possible to prevent the contact failure that may occur with the terminals provided inside the connector and to stabilize the electrical conduction between the FPC unit and the connector.

Figure 3:
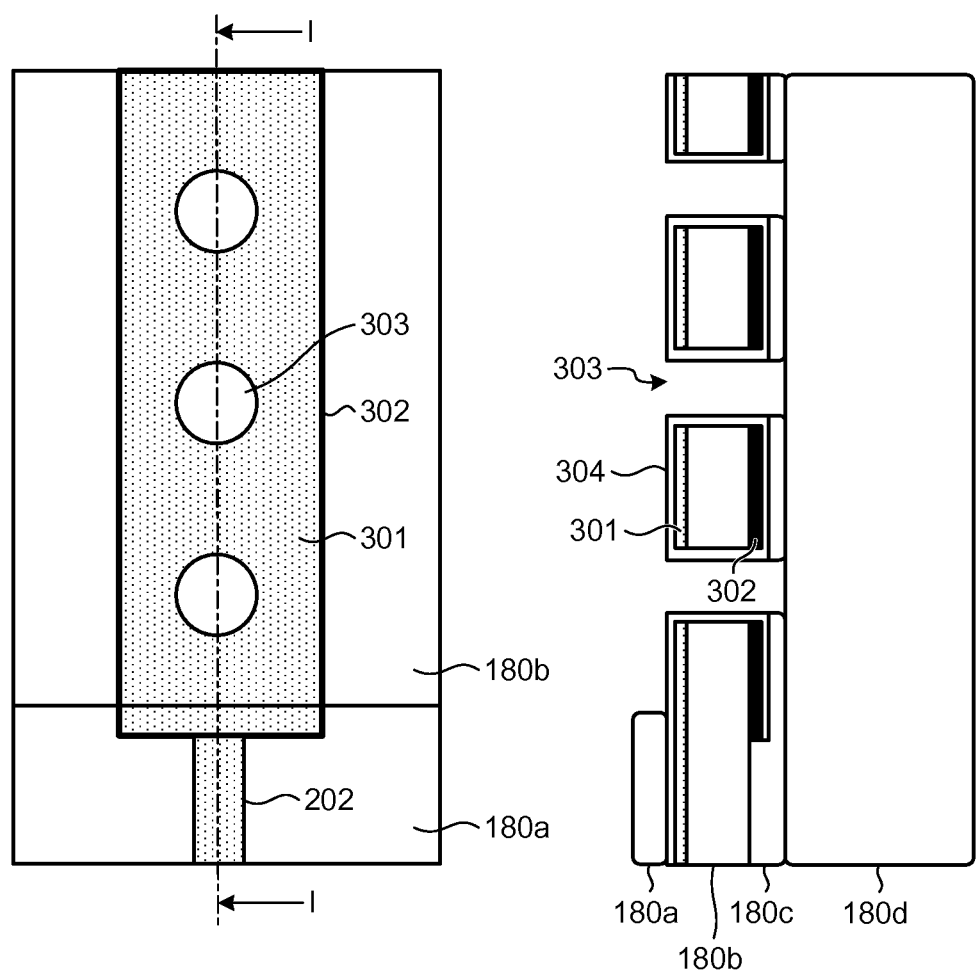
FIG. 3 represents drawings that illustrate each of pads according to the first embodiment.

FIG. 3 represents drawings that illustrate each of the pads 204 according to the first embodiment. The drawing on the left side of FIG. 3 is a front view of the pad 204, whereas the drawing on the right side of FIG. 3 is a cross section at the line I-I in the drawing on the left side.

As illustrated in FIG. 3, the pad 204 has a conductor pattern 301 formed on the first surface, a conductor pattern 302 formed on the second surface, and three through holes 303 that connect the conductor patterns formed on the two surfaces to each other. In other words, the pad 204 is structured by forming the conductor patterns 301 and 302 on the two surfaces of an FPC core 180b serving as a core member of the FPC unit 180 and further having the conductor patterns 301 and 302 connected to each other by the three through holes 303 formed so as to go through the FPC core 180b.

In the drawing on the left side of FIG. 3, the conductor pattern 301 formed on the first surface is indicated with hatching, whereas the outline of the conductor pattern 302 formed on the second surface is indicated with a bold line.

As illustrated in this drawing, in the first embodiment, the conductor pattern 301 formed on the first surface and the conductor pattern 302 formed on the second surface have mutually the same size. Further, the wiring pattern 202 is connected to the conductor pattern 301 formed on the first surface.

The wiring pattern 202 and a part of the conductor pattern 301 formed on the first surface are covered by the cover lay 180a. In other words, the end of the conductor pattern 301 connected to the wiring pattern 202 and the entire wiring pattern 202 are covered by the cover lay 180a so as not to be exposed. Because the wiring pattern 202 and the conductor pattern 301 are covered by the cover lay 180a in this manner, it is possible to prevent the wiring pattern 202 and the conductor pattern 301 from being detached from the FPC core 180b.

Further, as illustrated on the right side of FIG. 3, the conductor patterns 301 and 302 are coated with metal plating 304. At the three through holes 303, the metal plating 304 connects the conductor patterns 301 and 302 to each other. Consequently, the conductor patterns 301 and 302 formed on the two surfaces of the FPC core 180b are electrically connected to each other via the through holes 303. Further, on the second surface on which the conductor pattern 302 is formed, the conductor pattern 302 and the metal plating 304 are covered by a cover lay 180c. Further, by pasting a reinforcing plate 180d onto the cover lay 180c, the strength of the FPC unit 180 is assured. In this situation, the FPC core 180b, the cover lays 180a and 180c, and the reinforcing plate 180d may be manufactured by, for example, shaping polyimide resin.

Although FIG. 3 illustrates a configuration of the pad 204 connected to the wiring pattern 202 formed on the first surface of the FPC unit 180, each of the pads 204 connected to the wiring patterns 203 formed on the second surface of the FPC unit 180 also has the same configuration, except that the wiring patterns 203 are connected to the conductor patterns 302 formed on the second surface.

As explained above, each of the pads 204 is configured in such a manner that the conductor patterns 301 and 302 that have mutually the same size and are formed on the two surfaces of the FPC core 180b are connected to each other by the through holes 303. By using these pads 204, it is possible to connect the wiring patterns 201 and 202 formed on the first surface to the conductor patterns 301 and to connect the wiring patterns 203 formed on the second surface to the conductor patterns 302. Further, because the conductor patterns 301 are exposed without being covered by the cover lay 180a, when the end of the FPC unit 180 is connected to the connector, the conductor patterns 301 come in contact with the terminals provided inside the connector. In this situation, because the plurality of pads 204 have mutually the same configuration, the thickness and the firmness are uniform among all the pads 204, and it is therefore possible to prevent the contact failure that may occur between the conductor patterns 301 and the terminals provided inside the connector. As a result, it is possible to stabilize the electrical conduction between the FPC unit and the connector.

As explained above, according to the first embodiment, the pads that are connected to the wiring patterns are structured by forming the conductor patterns having mutually the same size on the first and the second surfaces of the FPC unit and further connecting the conductor patterns to each other via the three through holes. With this arrangement, it is possible to arrange the pads corresponding to the wiring patterns formed on the first and the second surfaces of the FPC unit to have mutually the same configuration, and it is therefore possible to arrange the thickness and the firmness to be uniform among all the pads. As a result, it is possible to prevent the contact failure that may occur between the pads and the terminals provided inside the connector and to stabilize the electrical conduction between the FPC unit and the connector.

[b] Second Embodiment

A characteristic of a second embodiment lies in that the possibility of having migration is lowered by narrowing the conductor patterns covered by the cover lay so as to enlarge the gap between each of the conductor patterns and an adjacently-positioned conductor.

Because the configuration of an optical module according to the second embodiment is the same as that in the first embodiment, the explanation thereof will be omitted. In the second embodiment, the configuration of each of the pads 204 provided on the FPC unit 180 is different from that in the first embodiment.

Figure 4:
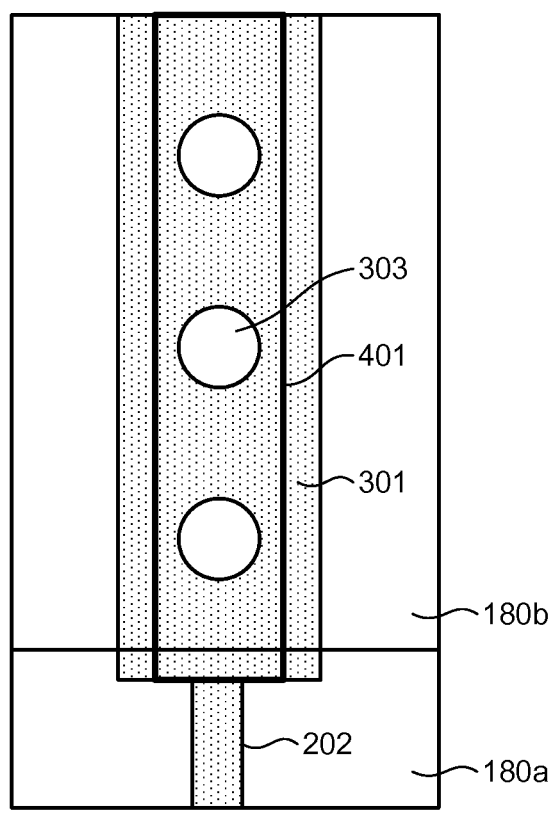
FIG. 4 is a drawing that illustrates each of the pads according to a second embodiment.

FIG. 4 is a drawing that illustrates each of the pads 204 according to a second embodiment. In FIG. 4, some of the elements that are the same as those in FIG. 3 will be referred to by using the same reference characters. As illustrated in FIG. 4, the pad 204 has the conductor pattern 301 formed on the first surface, a conductor pattern 401 formed on the second surface, and the three through holes 303 that connect the conductor patterns formed on the two surfaces to each other. In other words, the pad 204 is structured by forming the conductor patterns 301 and 401 on the two surfaces of the FPC core 180b and further having the conductor patterns 301 and 401 connected to each other by the three through holes 303 formed so as to go through the FPC core 180b.

In FIG. 4, the conductor pattern 301 formed on the first surface is indicated with hatching, whereas the outline of the conductor pattern 401 formed on the second surface is indicated with a bold line. As illustrated in FIG. 4, in the second embodiment, the conductor pattern 401 formed on the second surface is narrower than the conductor pattern 301 formed on the first surface, but is wider than the diameter of each of the through holes 303. In other words, the width of the conductor pattern 401 that is formed on the second surface and is covered by the cover lay 180c is smaller than the width of the conductor pattern 301 that is formed on the first surface and is exposed.

The width of the conductor pattern 401 is arranged to be smaller as explained above for the following reasons: When a plurality of conductor patterns are covered by a cover lay made of an electrically-insulative material, if an electric current flows through the conductor patterns for a long period of time, migration may occur where the metal used in the conductor patterns may migrate via the cover lay. If migration has occurred, there is a possibility that a short circuit or the like may be caused between the conductor patterns and that the optical module may break down. To cope with this situation, in the second embodiment, for the purpose of enlarging the gap between the conductor patterns 401 that are positioned adjacent to each other, the width of each of the conductor patterns 401 is arranged to be as small as possible. Accordingly, by enlarging the gap between the adjacently-positioned conductor patterns 401, it is possible to prevent the metal used in the conductor patterns 401 from migrating and to thus lower the possibility of migration occurrence.

As explained above, according to the second embodiment, of the conductor patterns that are formed on the two surfaces of the FPC unit and are connected to each other by the through holes, the width of each of the conductor patterns covered by the cover lay is arranged to be smaller than the width of each of the exposed conductor patterns. With this arrangement, it is possible to enlarge the gap between the conductor patterns covered by the cover lay and to thus lower the possibility of migration occurrence.

[c] Third Embodiment

A characteristic of a third embodiment lies in that some areas are reserved for forming lands in surrounding areas of the through holes, by narrowing the conductor patterns covered by the cover lay and, at the same time, widening the conductor patterns in surrounding areas of the through holes.

Because the configuration of an optical module according to the third embodiment is the same as that in the first embodiment, the explanation thereof will be omitted. In the third embodiment, the configuration of each of the pads 204 provided on the FPC unit 180 is different from that in the first embodiment.

Figure 5:
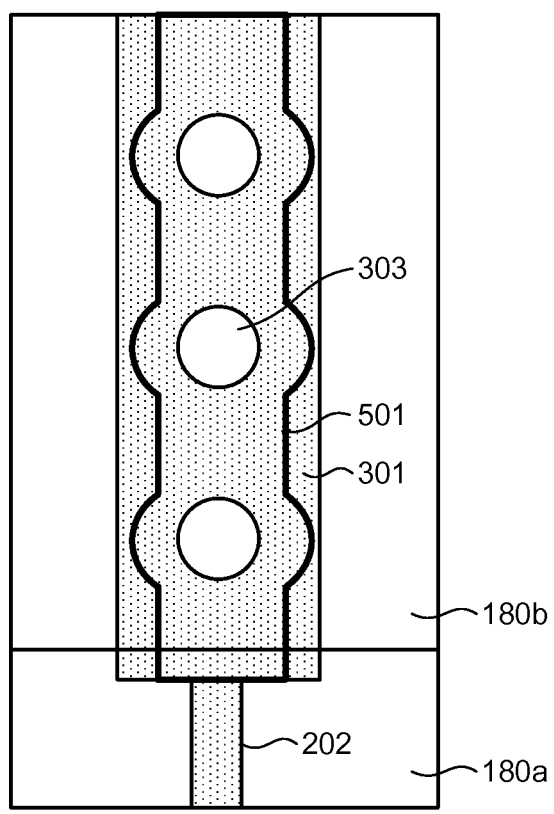
FIG. 5 is a drawing that illustrates each of the pads according to a third embodiment.

FIG. 5 is a drawing that illustrates each of the pads 204 according to the third embodiment. In FIG. 5, some of the elements that are the same as those in FIG. 3 will be referred to by using the same reference characters. As illustrated in FIG. 5, the pad 204 has the conductor pattern 301 formed on the first surface, a conductor pattern 501 formed on the second surface, and the three through holes 303 that connect the conductor patterns formed on the two surfaces to each other. In other words, the pad 204 is structured by forming the conductor patterns 301 and 501 on the two surfaces of the FPC core 180*b* and further having the conductor patterns 301 and 501 connected to each other by the three through holes 303 formed so as to go through the FPC core 180*b*.

In FIG. 5, the conductor pattern 301 formed on the first surface is indicated with hatching, whereas the outline of the conductor pattern 501 formed on the second surface is indicated with a bold line. As illustrated in FIG. 5, in the third embodiment, the conductor pattern 501 formed on the second surface is narrower than the conductor pattern 301 formed on the first surface, but is wider than the diameter of each of the through holes 303. In other words, the width of the conductor pattern 501 that is formed on the second surface and is covered by the cover lay 180*c* is smaller than the width of the conductor pattern 301 that is formed on the first surface and is exposed.

More specifically, the width of the conductor pattern 501 is substantially equal to the width of the conductor pattern 301 in surrounding areas of the through holes 303; however, in the area other than the surrounding areas of the through holes 303, the conductor pattern 501 is shaped so as to be narrower than the conductor pattern 301. By widening the width of the conductor pattern 501 in the surrounding areas of the through holes 303 in accordance with the diameter of each of the through holes 303 in this manner, it is possible to reserve sufficiently large areas for forming the lands in surrounding areas of the through holes 303. Further, by forming the lands with the conductor pattern 501, it is possible to cause the conductor pattern 501 formed on the second surface and the conductor pattern 301 formed on the first surface to be electrically connected to each other by the through holes 303 with certainty. In contrast, in the area other than the surrounding areas of the through holes 303, by enlarging the gap between the adjacently-positioned conductor patterns 501 by narrowing the width of each of the conductor patterns 501, it is possible to lower the possibility of migration occurrence.

As explained above, according to the third embodiment, of the conductor patterns that are formed on the two surfaces of the FPC unit and are connected to each other by the through holes, the width of each of the conductor patterns covered by the cover lay is arranged to be smaller than the width of each of the exposed conductor patterns. The width of each of the conductor patterns having the smaller width, however, is also widened in the surrounding areas of the through holes in accordance with the diameter of each of the through holes. With these arrangements, it is possible to reserve sufficiently large areas for the conductor patterns to be used for forming the lands in the surrounding areas of the through holes, while lowering the possibility of migration occurrence.

Figure 6:
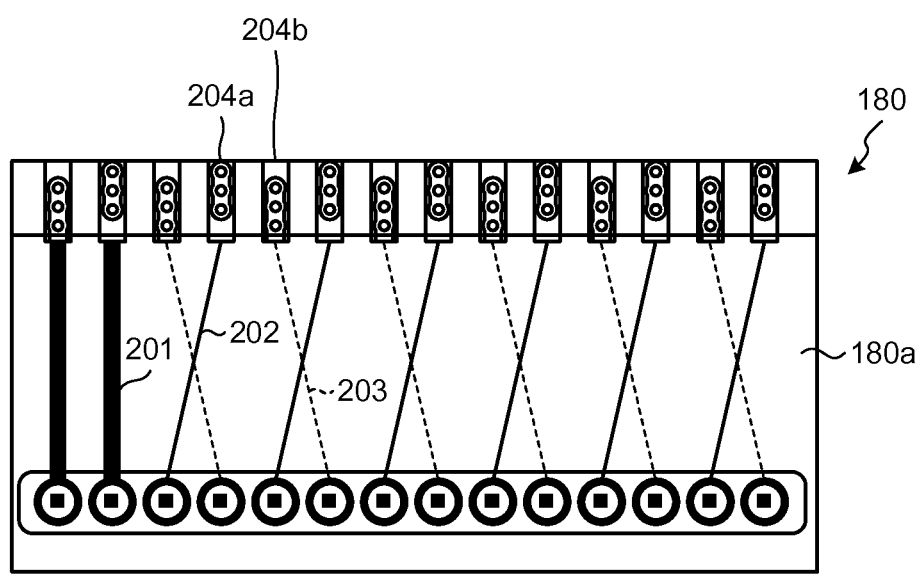
FIG. 6 is a drawing for explaining a modification example of the third embodiment.

In the third embodiment described above, another arrangement is acceptable in which the positions of the through holes 303 and the conductor patterns 501 are staggered between adjacently-positioned pads 204. FIG. 6 is a drawing for explaining a modification example of the FPC unit 180 according to the third embodiment. In FIG. 6, some of the elements that are the same as those in FIG. 2 will be referred to by using the same reference characters.

As illustrated in FIG. 6, the positions of the through holes and the conductor patterns formed on the second surface are staggered, between pads 204*a* connected to the wiring patterns 202 formed on the first surface and pads 204*b* connected to the wiring patterns 203 formed on the second surface. More specifically, the wider sections of the conductor patterns structuring the pads 204*a* are positioned next to the narrower sections of the conductor patterns structuring the pads 204*b*. Similarly, the narrower sections of the conductor patterns structuring the pads 204*a* are positioned next to the wider sections of the conductor patterns structuring the pads 204*b*. By adjusting the positions of the through holes 303 and the conductor patterns 501 in this manner so that the wider sections and the narrower sections of the conductor patterns 501 formed on the second surface are positioned next to each other, it is possible to uniformly enlarge the gap between the adjacently-positioned conductor patterns 501. As a result, it is possible to lower the possibility of migration occurrence.

[d] Fourth Embodiment

A characteristic of a fourth embodiment lies in that the possibility of migration occurrence is lowered by narrowing the conductor patterns covered by the cover lay, and at the same time, arranging surrounding areas of the through holes to be not covered by the cover lay.

Because the configuration of an optical module according to the fourth embodiment is the same as that in the first embodiment, the explanation thereof will be omitted. In the fourth embodiment, the configuration of each of the pads 204 provided on the FPC unit 180 is different from that in the first embodiment.

Figure 7:
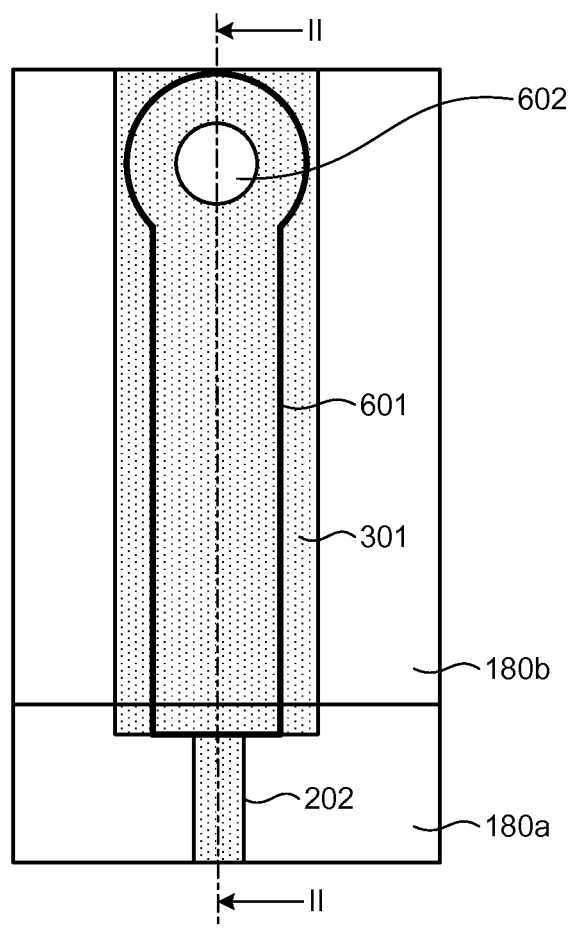
FIG. 7 is a drawing that illustrates each of the pads according to a fourth embodiment.

FIG. 7 is a drawing that illustrates each of the pads 204 according to the fourth embodiment. In FIG. 7, some of the elements that are the same as those in FIG. 3 will be referred to by using the same reference characters. As illustrated in FIG. 7, the pad 204 has the conductor pattern 301 formed on the first surface, a conductor pattern 601 formed on the second surface, and a through hole 602 that connects the conductor patterns formed on the two surfaces to each other. In other words, the pad 204 is structured by forming the conductor patterns 301 and 601 on the two surfaces of the FPC core 180*b* and further having the conductor patterns 301 and 601 connected to each other by the one through hole 602 formed so as to go through the FPC core 180*b*.

In FIG. 7, the conductor pattern 301 formed on the first surface is indicated with hatching, whereas the outline of the conductor pattern 601 formed on the second surface is indicated with a bold line. As illustrated in FIG. 7, in the fourth embodiment, the conductor pattern 601 formed on the second surface is narrower than the conductor pattern 301 formed on the first surface, but is wider than the diameter of the through hole 602. In other words, the width of the conductor pattern 601 that is formed on the second surface and is covered by the cover lay 180*c* is smaller than the width of the conductor pattern 301 that is formed on the first surface and is exposed.

More specifically, the width of the conductor pattern 601 is substantially equal to the width of the conductor pattern 301 in a surrounding area of the through hole 602; however, in the area other than the surrounding area of the through hole 602, the conductor pattern 601 is shaped so as to be narrower than the conductor pattern 301. By widening the width of the conductor pattern 601 in the surrounding area of the through hole 602 in accordance with the diameter of the through hole 602 in this manner, it is possible to reserve a sufficiently large area for forming a land in a surrounding area of the through hole 602. Further, by forming the land with the conductor pattern 601, it is possible to cause the conductor pattern 601 formed on the second surface and the conductor pattern 301 formed on the first surface to be electrically connected to each other by the through hole 602 with certainty. In contrast, in the area other than the surrounding area of the through hole 602, by enlarging the gap between the adjacently-positioned conductor patterns 601 by narrowing the width of each of the conductor patterns 601, it is possible to lower the possibility of migration occurrence.

Figure 8:
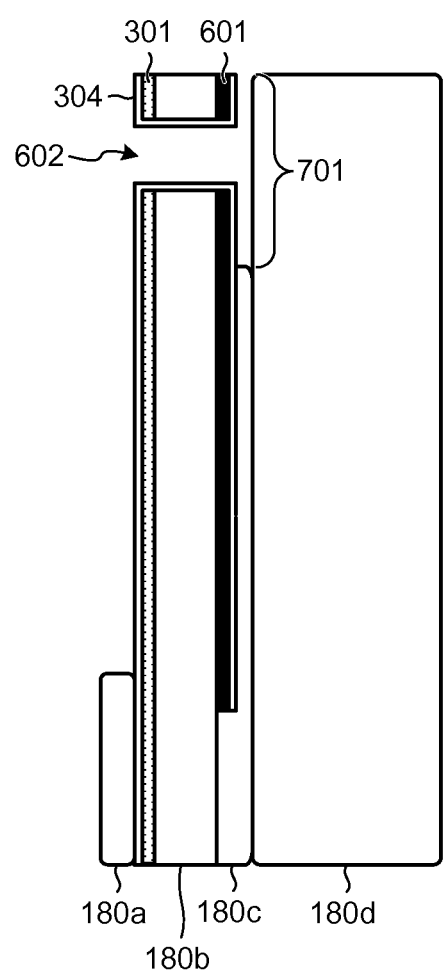
FIG. 8 is a cross-sectional view at the line II-II in FIG. 7.

FIG. 8 is a cross-sectional view at the line II-II in FIG. 7. In FIG. 8, some of the elements that are the same as those in FIG. 3 will be referred to by using the same reference characters. As illustrated in FIG. 8, the through hole 602 is formed at a tip end of the pad 204. Further, as a focus is placed on the conductor pattern 601 formed on the second surface, the surrounding area of the through hole 602 is not covered by the cover lay 180*c*, and an uncovered area 701 is thus provided. In this manner, by providing the uncovered area 701 that is not covered by the cover lay 180*c* in the surrounding area of the through hole 602, it is possible to lower the possibility of migration occurrence even if the width of the conductor pattern 601 is widened in the surrounding area of the through hole 602.

As explained above, according to the fourth embodiment, of the conductor patterns that are formed on the two surfaces of the FPC unit and are connected to each other by the through hole, the width of each of the conductor patterns covered by the cover lay is arranged to be smaller than the width of each of the exposed conductor patterns. The width of each of the conductor patterns having the smaller width, however, is also widened in the surrounding area of the through hole in accordance with the diameter of the through hole, and the surrounding area of the through hole is arranged not to be covered by the cover lay. With these arrangements, it is possible to reserve sufficiently large areas for the conductor patterns to be used for forming the lands in the surrounding areas of the through holes, while lowering the possibility of migration occurrence.

Figure 9:
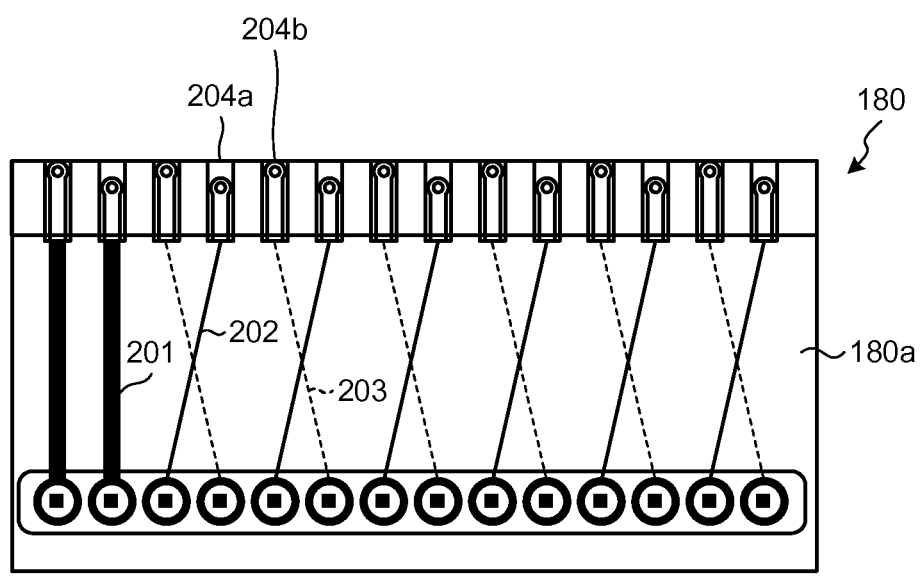
FIG. 9 is a drawing for explaining a modification example of the fourth embodiment.

In the fourth embodiment described above, another arrangement is acceptable in which the positions of the through holes 602 and the conductor patterns 601 are staggered between adjacently-positioned pads 204, without providing the uncovered area 701. FIG. 9 is a drawing for explaining a modification example of the FPC unit 180 according to the fourth embodiment. In FIG. 9, some of the elements that are the same as those in FIG. 2 will be referred to by using the same reference characters.

As illustrated in FIG. 9, the pads 204*a* connected to the wiring patterns 202 formed on the first surface and the pads 204*b* connected to the wiring patterns 203 formed on the second surface are staggered in terms of the positions of the through holes and the conductor patterns formed on the second surface. More specifically, the wider sections of the conductor patterns structuring the pads 204*a* are positioned next to the narrower sections of the conductor patterns structuring the pads 204*b*. The conductor patterns structuring the pads 204*a* are not extending up to the wider sections of the conductor patterns structuring the pads 204*b*. By adjusting, in this manner, the positions of the through holes 602 and the conductor patterns 601 so that the wider sections of the conductor patterns 501 formed on the second surface are not positioned next to each other, it is possible to enlarge the gap between the adjacently-positioned conductor patterns 601. As a result, it is possible to lower the possibility of migration occurrence, without providing the uncovered area 701.

Further, in the embodiments described above, the DC pins 170 are configured to protrude from the lateral face of the optical modulator 110, while being arranged in a row. However, by arranging the DC pins 170 in two rows, for example, it is possible to shorten the dimension of the optical modulator 110 in the longitudinal direction. Further, by arranging the plurality of DC pins 170 in two rows, it is also possible to reduce the width of the FPC unit 180. It is therefore possible to make the optical module compact.

Figure 10:
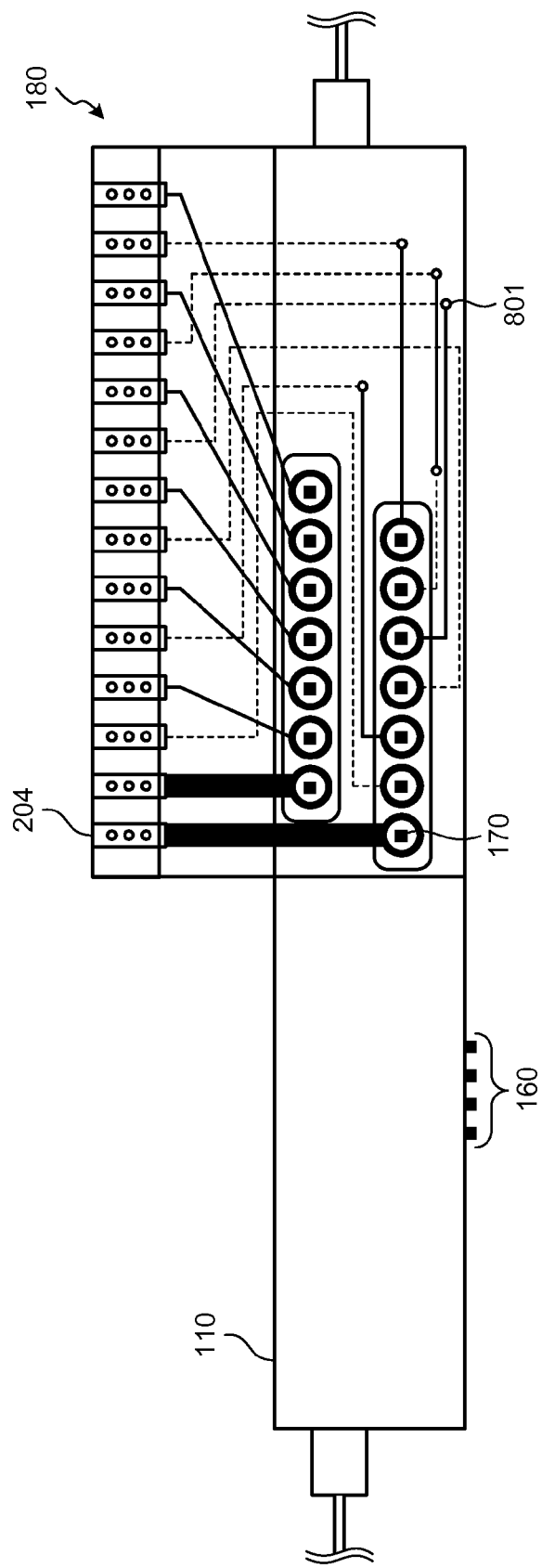
FIG. 10 is a drawing of a specific example of wirings.

FIG. 10 is a drawing of a specific example of wirings for the FPC unit 180 when the DC pins 170 are configured to protrude from a lateral face of the optical modulator 110, while being arranged in two rows.

As illustrated in FIG. 10, when the DC pins 170 are arranged in two rows, the wiring patterns connecting the DC pins 170 and the pads 204 to one another are more likely to intersect one another. To cope with this situation, the wiring patterns are routed through holes 801, so that none of the wiring patterns intersects another wiring pattern formed on the same surface of the FPC unit 180. In FIG. 10, the parts of the wirings indicated with solid lines are the wirings provided on the first surface of the FPC unit 180 positioned closer to viewers of the drawing. The parts of the wirings indicated with broken lines are the wirings provided on the second surface of the FPC unit 180 positioned farther from viewers of the drawing.

Further, in FIG. 10, the pads 204 connected to the DC pins 170 arranged in the upper row are connected, on the first surface, to the wiring patterns, whereas the pads 204 connected to the DC pins 170 arranged in the lower row are connected, on the second surface, to the wiring patterns. Further, the wiring patterns connecting the DC pins 170 arranged in the lower row and the pads 204 to one another detour around the DC pins 170 arranged in the upper row while being routed through the through holes 801. In this situation, by causing the wiring patterns connecting the DC pins 170 in the lower row and the pads 204 to one another to make the detour on the farther side from the RF pins 160, so that the wirings for the RF signals and the wirings for the DC signals are positioned apart from each other, it is possible to reduce interference that may occur between the RF signals and the DC signals.

As explained above, by arranging the DC pins 170 in the two rows and arranging the wiring patterns between the DC pins 170 and the pads 204 to be formed on the first and the second surfaces of the FPC unit 180 so as to intersect one another, it is possible to make the FPC unit 180 and the optical modulator 110 compact. Further, by arranging the wiring patterns extending from the DC pins 170 arranged in the one of the rows to detour around the DC pins 170 arranged in the other row so as to be positioned away from the RF pins 160, it is possible to reduce the interference that may occur between the RF signals and the DC signals.

Further, when the DC pins 170 are arranged in two rows as explained above, there are both some pads 204 that are connected, on the first surface of the FPC unit 180, to the wiring patterns and other pads 204 that are connected, on the second surface of the FPC unit 180, to the wiring patterns. Even in this situation, because the pads 204 are configured as described in the embodiments described above, the thickness and the firmness are uniform among the pads 204, and it is therefore possible to prevent the contact failure that may occur between the pads 204 and the terminals provided inside the connector.

Figure 11:
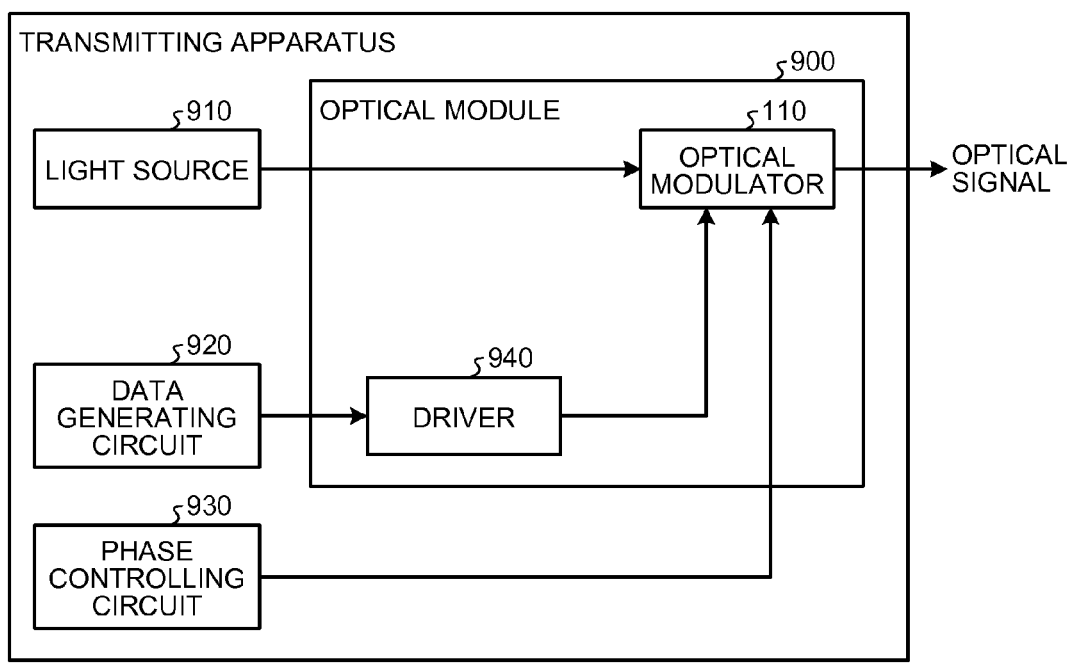
FIG. 11 is a block diagram of an exemplary configuration of a transmitting apparatus.

The optical module explained in the embodiments above may be, for example, provided in a transmitting apparatus configured to transmit an optical signal. FIG. 11 is a block diagram of an exemplary configuration of such a transmitting apparatus. As illustrated in FIG. 11, the transmitting apparatus includes an optical module 900, a light source 910, a data generating circuit 920, and a phase controlling circuit 930.

The optical module 900 is the optical module explained in any of the embodiments described above and is configured so that a driver 940 is connected to the optical modulator 110. The optical modulator 110 and the driver 940 are connected to each other by an FPC unit, for example. RF signals output from the driver 940 are input to the optical modulator 110 from the RF pins 160. The optical module 900 performs an optical modulation process on light from the light source 910 and outputs an optical signal to an optical fiber, for example.

The light source 910 includes, for example, a laser diode (LD) or the like and is configured to generate light. Further, the light generated by the light source 910 is input to the optical modulator 110 included in the optical module 900.

The data generating circuit 920 generates transmission data. The transmission data is input to the driver 940 included in the optical module 900, so that the driver 940 generates RF signals having a waveform corresponding to the transmission data. Further, the RF signals are supplied from the driver 940 to the optical modulator 110 via the RF pins 160, so that an optical modulation process based on the RF signals is performed.

The phase controlling circuit 930 generates DC signals used for controlling the phase of the optical signal of the optical modulator 110. The optical modulator 110 and the phase controlling circuit 930 are connected to each other by the FPC unit 180, so that the DC signals generated by the phase controlling circuit 930 are input to the optical modulator 110 from the DC pins 170. When the DC signals used for controlling the phase of the optical signal are input to the optical modulator 110 from the DC pins 170, phase control based on the DC signals is exercised.

In this situation, the pads 204 provided on the FPC unit 180 connecting the optical modulator 110 and the phase controlling circuit 930 to each other have mutually the same configuration for all the wiring patterns. Consequently, when one end of the FPC unit 180 is inserted into a connector positioned on the phase controlling circuit 930 side, the pads 204 equally come into contact with the terminals provided inside the connector, and the electrical conduction between the FPC unit 180 and the connector becomes stable. As a result, the optical modulator 110 and the phase controlling circuit 930 are connected to each other with certainty, and it is therefore possible to properly control the phase of the optical signal of the optical modulator 110. Further, the transmitting apparatus is able to transmit the transmission data with a high level of precision.

According to at least one aspect of the optical module and the transmitting apparatus disclosed herein, an advantageous effect is achieved where it is possible to stabilize the electrical conduction between the FPC unit on which the wiring patterns are formed on the plurality of surfaces and the connector.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising:
an optical modulator that performs an optical modulation process by using electrical signals input thereto from a plurality of pins; and
a flexible substrate that has flexibility and that electrically connects the optical modulator and a predetermined connector to each other via a plurality of wiring patterns formed on first and second surfaces thereof, wherein
the flexible substrate includes:
a plurality of lands each of which is joined to a different one of the pins of the optical modulator;
a first pad that is connectable to the connector and includes a first conductor pattern being connected, on the first surface, to a wiring pattern extending from a first land among the plurality of lands, a second conductor pattern being formed on the second surface in a position corresponding to a position of the first conductor pattern, and a through hole that connects the first conductor pattern and the second conductor pattern to each other; and
a second pad that is connectable to the connector and includes a third conductor pattern being connected, on the second surface, to a wiring pattern extending from a second land among the plurality of lands, a fourth conductor pattern being formed on the first surface in a position corresponding to a position of the third conductor pattern, and a through hole that connects the third conductor pattern and the fourth conductor pattern to each other.

2. The optical module according to claim 1, wherein
the first pad is connected to the connector by bringing the first conductor pattern and a terminal of the connector into contact with each other, and
the second pad is connected to the connector by bringing the fourth conductor pattern and a terminal of the connector into contact with each other.

3. The optical module according to claim 2, wherein
the flexible substrate further includes a cover lay that covers the wiring pattern formed on the second surface as well as the second and third conductor patterns of the first pad and the second pad positioned adjacent to each other, and
the second and the third conductor patterns are each shaped so as to have a smaller width than a width of each of the first and the fourth conductor patterns.

4. The optical module according to claim 3, wherein the second and the third conductor patterns are each shaped so as to have a larger width in a surrounding area of the through hole than in other areas.

5. The optical module according to claim 4, wherein the cover lay does not cover the second and the third conductor patterns in the surrounding area of the through hole.

6. The optical module according to claim 4, wherein the second and the third conductor patterns are arranged in such positions that respective through holes are not positioned next to each other.

7. A transmitting apparatus comprising:
a light source that generates light;
an optical modulator that generates a transmission signal by performing an optical modulation process on the light generated by the light source, by using electrical signals input thereto from a plurality of pins; and
a flexible substrate that has flexibility and that electrically connects the optical modulator and a predetermined connector to each other via a plurality of wiring patterns formed on first and second surfaces thereof, wherein
the flexible substrate includes:
a plurality of lands each of which is joined to a different one of the pins of the optical modulator;
a first pad that is connectable to the connector and includes a first conductor pattern being connected, on the first surface, to a wiring pattern extending from a first land among the plurality of lands, a second conductor pattern being formed on the second surface in a position corresponding to a position of the first conductor pattern, and a through hole that connects the first conductor pattern and the second conductor pattern to each other; and
a second pad that is connectable to the connector and includes a third conductor pattern being connected, on the second surface, to a wiring pattern extending from a second land among the plurality of lands, a fourth conductor pattern being formed on the first surface in a position corresponding to a position of the third conductor pattern, and a through hole that connects the third conductor pattern and the fourth conductor pattern to each other.

* * * * *